United States Patent
Hollis

(10) Patent No.: US 11,912,380 B2
(45) Date of Patent: *Feb. 27, 2024

(54) SYSTEMS AND METHODS FOR DIVE MASKS WITH REMOTE DISPLAYS

(71) Applicant: Pelagic Pressure Systems Corp., San Leandro, CA (US)

(72) Inventor: Michael S. Hollis, Alameda, CA (US)

(73) Assignee: Pelagic Pressure Systems Corp., San Leandro, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,067

(22) Filed: Mar. 29, 2021

(65) Prior Publication Data

US 2021/0214061 A1    Jul. 15, 2021

Related U.S. Application Data

(63) Continuation of application No. 15/799,429, filed on Oct. 31, 2017, now Pat. No. 10,960,961, which is a continuation of application No. 14/507,443, filed on Oct. 6, 2014, now Pat. No. 9,821,893.

(51) Int. Cl.
  *G06F 9/4401* (2018.01)
  *B63C 11/12* (2006.01)
  *B63C 11/26* (2006.01)

(52) U.S. Cl.
  CPC ............ *B63C 11/12* (2013.01); *G06F 9/4411* (2013.01); *B63C 11/26* (2013.01); *B63C 2011/121* (2013.01)

(58) Field of Classification Search
  CPC ... B63C 11/12; B63C 11/26; B63C 2011/121; G06F 9/4411
  See application file for complete search history.

(56) References Cited

U.S. PATENT DOCUMENTS

| | | |
|---|---|---|
| 5,512,941 A | 4/1996 | Takahashi et al. |
| 6,360,182 B1 | 3/2002 | Hales |
| 6,396,769 B1 | 5/2002 | Polany |
| 6,519,548 B1 | 2/2003 | Kuroda et al. |

(Continued)

OTHER PUBLICATIONS

Smart Swimming Googles, Yanko design, pp. 1-16, Apr. 2016.*

(Continued)

*Primary Examiner* — Aurel Prifti
(74) *Attorney, Agent, or Firm* — KPPB LLP

(57) ABSTRACT

Systems and methods for configurable dive masks in accordance with embodiments of the invention are illustrated. In one embodiment, a configurable dive mask including a dive mask frame, at least one lens located within the dive mask frame, a display device viewable through the at least one lens, a processor, a dive device data circuit that obtains dive device data from a set of sensor devices, a configuration interface circuit that communicates with configuration devices to obtain configuration data when the configuration interface is above water; and memory storing configuration data and dive device data, wherein the processor receives configuration data via the configuration interface, receives dive device data via the dive device interface, determines a portion of the dive device data to display based upon the configuration data, and displays dive device data in accordance with configuration data.

33 Claims, 6 Drawing Sheets

(56) References Cited

U.S. PATENT DOCUMENTS

| | | |
|---|---|---|
| 6,525,762 B1 | 2/2003 | Mileski et al. |
| 6,543,444 B1 | 4/2003 | Lewis |
| 6,549,850 B2 | 4/2003 | Punkka et al. |
| 6,701,252 B2 | 3/2004 | Brown |
| 6,712,017 B2 | 3/2004 | Harrie et al. |
| 6,769,508 B1 | 8/2004 | O'Connor |
| 6,842,402 B2 | 1/2005 | Germiquet et al. |
| 6,868,360 B1* | 3/2005 | Olstad .................... G01C 17/18 702/92 |
| 6,931,339 B1* | 8/2005 | Olstad .................... G01C 17/18 702/92 |
| 6,931,348 B2 | 8/2005 | Furuta et al. |
| 6,977,671 B1* | 12/2005 | Kitson .................... H04N 5/772 348/81 |
| 7,144,198 B2 | 12/2006 | Hirose et al. |
| 7,383,150 B2 | 6/2008 | Angelini et al. |
| 7,698,091 B2 | 4/2010 | Claude |
| 7,797,124 B2* | 9/2010 | Hollis ................ G01N 33/0036 128/204.22 |
| 8,378,793 B1* | 2/2013 | Bryant .................... B63C 11/02 340/384.73 |
| 8,600,701 B2 | 12/2013 | Hollis et al. |
| 9,254,900 B2 | 2/2016 | Hollis et al. |
| 9,733,227 B2 | 8/2017 | Hollis et al. |
| 10,183,731 B2 | 1/2019 | Hollis et al. |
| 10,422,781 B2 | 9/2019 | Hollis et al. |
| 10,960,961 B2 | 3/2021 | Hollis |
| 2002/0109601 A1* | 8/2002 | Arens ................ G08B 21/0227 340/506 |
| 2003/0115010 A1* | 6/2003 | Estep .................... B63C 11/12 702/127 |
| 2004/0022129 A1 | 2/2004 | McGeever, Jr. et al. |
| 2004/0068371 A1 | 4/2004 | Estep |
| 2006/0066477 A1 | 3/2006 | Hollis et al. |
| 2008/0156327 A1* | 7/2008 | Hollis .................... G01C 5/06 128/201.27 |
| 2008/0192114 A1* | 8/2008 | Pearson ................ B63C 11/12 396/25 |
| 2008/0198026 A1* | 8/2008 | Hatton-Downward ...................... B63C 11/2209 340/614 |
| 2009/0135022 A1* | 5/2009 | Hollis .................... G01S 19/14 340/850 |
| 2010/0299073 A1* | 11/2010 | Metzler .................... B63C 11/02 73/865.1 |
| 2010/0302233 A1* | 12/2010 | Holland ................ G06T 19/00 707/E17.018 |
| 2011/0055746 A1* | 3/2011 | Mantovani .............. B63C 11/26 715/848 |
| 2011/0196643 A1 | 8/2011 | Hollis et al. |
| 2012/0327256 A1* | 12/2012 | Robson .................. G03B 17/04 2/160 |
| 2013/0144558 A1* | 6/2013 | Hollis .................. G01C 13/008 702/187 |
| 2015/0071039 A1* | 3/2015 | Rahkonen .............. H04B 11/00 367/134 |
| 2015/0271396 A1* | 9/2015 | Lee ...................... H04N 5/2257 348/222.1 |
| 2016/0068242 A1* | 3/2016 | Govoni ................ G08B 21/182 2/426 |
| 2016/0080888 A1* | 3/2016 | Kreitzer .................. H04B 7/26 455/39 |
| 2016/0096601 A1* | 4/2016 | Hollis ..................... B63C 11/12 713/1 |
| 2016/0231300 A1 | 8/2016 | Hollis et al. |
| 2017/0307577 A1 | 10/2017 | Hollis et al. |
| 2018/0050775 A1 | 2/2018 | Hollis |
| 2018/0199010 A1 | 7/2018 | Hollis |

OTHER PUBLICATIONS

"ATOM Operating Manual", Nov. 1, 2004, 152 pgs.
"B'air Owner's Manual", Lamartek, Inc., dba Dive Rite, Version Date: Jan. 6, 2018, 36 pgs.
"DataPlus, owner's guide", Oceanic, Document No. 12-1968, R3, (Jul. 1999), 1996, 106 pgs (presented in two parts).
"DataTrans, owner's guide", Oceanic, Document No. 12-1872, R3,Jun. 1997, 1995, 114 pgs.
"Dive Computer M2", mares, cod. 44200552, Rev. B, 2007, 34 pgs.
"Dive Profiler, Software 3.0 For Windows", ORCA Division of EIT, Inc., 1993, 43 pgs.
"Galileo Sol Manual", UWATEC, Metadata Indicates PDF Created Mar. 14, 2016, 80 pgs.
"Memo Mouse/DataTrak", UWATEC AG, Dynatron, AG, Zurich, 1996, 68 pgs.
"Phoenix Owner's Manual", ORCA, Division of EIT, Inc., 1992, 22 pgs.
Oceanic, "GEO Watch / Dive Computer Operating Manual", Doc No. 12-2734-r02, 2002 Design, 2006, pp. 106-120.
Oceanic, "GEO Watch/Dive Computer Operating Manual", Doc No. 12-2734-r01, Oct. 20, 2006, 42 pgs.
Oceanic, "GEO Watch/Dive Computer Operating Manual", Doc. No. 12-2734-r02, Apr. 26, 2007, 42 pgs.
Stewart et al., "Diving Safety Manual", Original Printing 1954, Revised 2002, 58 pages.

* cited by examiner

SYSTEMS AND METHODS FOR DIVE MASKS WITH REMOTE DISPLAYS

CROSS-REFERENCE TO RELATED APPLICATIONS

The instant application is a continuation of U.S. patent application Ser. No. 15/799,429, filed Oct. 31, 2017, which claims priority to U.S. patent application Ser. No. 14/507,443, filed Oct. 6, 2014, the disclosures of which are hereby incorporated by reference in their entireties.

FIELD OF THE INVENTION

The present invention is generally related to underwater dive masks and more specifically configurable dive masks capable of wireless communication.

BACKGROUND

The development of self-contained breathing systems has allowed humans to dive and remain underwater for several hours. The ability to remain underwater for an extended period of time can allow divers to reach considerable depths and cover expansive distances in exploring underwater terrain.

Radio frequency (RF) waves can be used to wirelessly transmit signals between devices. RF waves can be made to encode information by modulation of amplitude, frequency, and phase of a radio wave within a frequency band.

SUMMARY OF THE INVENTION

Systems and methods for configurable dive masks in accordance with embodiments of the invention are illustrated. In one embodiment, a configurable dive mask, includes, a display device, a processor, a dive device data interface that communicates with a set of dive devices to obtain dive device data, a configuration interface that wirelessly communicates with configuration devices to obtain configuration data, and memory containing configuration data, dive device data, and a display processing application, wherein the display processing application directs the processor to receive configuration data via the configuration interface, receive dive device data via the dive device interface, and display dive device data in accordance with configuration data.

In another embodiment of the invention, the configuration interface communicates using radio frequency communication technology.

In an additional embodiment of the invention, the dive device data interface communicates using magnetic communication technology.

In yet another additional embodiment of the invention, the configurable dive mask further includes multiple configuration interfaces, and each configuration interface uses a different communication technology.

In still another additional embodiment of the invention, the configurable dive mask further includes multiple dive device data interfaces, and each dive device data interface communicates with a distinct subset of dive devices.

In yet still another additional embodiment of the invention, the configurable dive mask further includes a set of integrated sensor components, a subset of the sensor components in the set of integrated sensor components collect dive device data, and the configurable dive mask obtains dive device data from the sensor components in the set of sensor components via the dive device data interface.

In yet another embodiment of the invention, the configurable dive mask obtains dive device data from sensor components in the set of sensor components via a hardwired connection.

In still another embodiment of the invention, the configurable dive mask is configured to communicate with a subset of the set of dive devices.

In yet still another embodiment of the invention, a first dive device in the set of dive devices obtains dive device data from a second separate and distinct dive device in the set of dive devices, and the first dive device processes obtained data to generate processed dive device data.

In yet another embodiment of the invention, the first dive device is configured to transmit the processed dive device data to the configurable dive mask via the dive device interface.

In still another embodiment of the invention, the memory contains a set of configuration data, and the display processing application configures the processor to utilize active configuration data in the processing of dive device data, where the active configuration data is selected from the set of configuration data.

In yet still another embodiment of the invention, the configurable dive mask further includes an input device configured to obtain input data, and the display processing application further configures the processor to select a second piece of configuration data from the set of configuration data as the active configuration data in response to the input data, where the second piece of configuration data is separate and distinct from the active configuration data.

In yet another embodiment of the invention, the input device is a button.

In still another embodiment of the invention, the display processing application further configures the processor to select a second piece of configuration data from the set of configuration data as the active configuration data in response to a received piece of dive device data, where the second piece of configuration data is separate and distinct from the active configuration data.

In yet still another embodiment of the invention, the configurable dive mask further includes a dive mask frame, and at least one lens.

In yet another embodiment of the invention, the dive mask controller is located within the dive mask frame.

In still another embodiment of the invention, the display device is embedded within the lens.

In yet still another embodiment of the invention, the at least one lens has a first connector connected to the display, the frame has a second connector connected to the dive mask controller, and the first connector and the second connector are coupled such that the dive mask controller communicates with the display device.

In yet another embodiment of the invention, the display device includes a segmented display.

In still another embodiment of the invention, the display device includes a set of light emitting diodes where each light emitting diode in the set of light emitting diodes has a different color.

In yet still another embodiment of the invention, the display device includes a set of organic light emitting diodes.

In yet another embodiment of the invention, the display device includes materials that prevent condensation on the display.

In still another embodiment of the invention, the display processing application further configures the memory to store a dive device data log.

In yet still another embodiment of the invention, the configuration data is validated using a device selected from the group consisting of the configuration device and the configurable dive mask.

In yet another embodiment of the invention, the configuration device determines if specific configuration data from the set of configuration data is safe to use by checking the configuration data against a known range of safe configuration data.

Still another embodiment of the invention includes a method for operating a configurable dive mask, including obtaining configuration data using a configuration device via a wireless configuration interface, obtaining dive device data using dive devices via a dive device data interface, and displaying the dive device data in accordance with the configuration data.

Yet still another embodiment of the invention includes a configurable dive mask including a dive mask frame, at least one lens located within the dive mask frame, a display device viewable through the at least one lens, a processor, a dive device data circuit that obtains dive device data from a variety of sensor devices, a configuration interface circuit that communicates with configuration devices to obtain configuration data when the configuration interface is above water; and memory storing configuration data and dive device data, wherein the processor receives configuration data via the configuration interface, receives dive device data via the dive device interface, determines a portion of the dive device data to display based upon the configuration data, and displays dive device data in accordance with configuration data.

In yet another additional embodiment of the invention, the configuration interface communicates using radio frequency communication technology.

In still another additional embodiment of the invention, the radio frequency communication technology conforms to the Bluetooth standard.

In yet still another additional embodiment of the invention, the dive device data interface communicates using magnetic communication technology.

In yet another embodiment of the invention, the configuration interface circuit is implemented using the processor.

In still another embodiment of the invention, a first sensor device in the set of sensor devices obtains dive device data from a second separate and distinct sensor device in the set of sensor devices and the first sensor device processes obtained data to generate processed dive device data.

In yet still another embodiment of the invention, the processed dive data is displayed using the display.

In yet another additional embodiment of the invention, the memory contains a set of configuration data and the processor utilizes an active configuration data in the processing of dive device data, where the active configuration data is selected from the set of configuration data.

In still another additional embodiment of the invention, the configurable dive mask further includes an input device that obtains input data and the processor further selects a second piece of configuration data from the set of configuration data as the active configuration data in response to the input data, where the second piece of configuration data is separate and distinct from the active configuration data.

In yet still another additional embodiment of the invention, the input device includes at least one button.

In yet another embodiment of the invention, the processor further selects a second piece of configuration data from the set of configuration data as the active configuration data in response to a received piece of dive device data, where the second piece of configuration data is separate and distinct from the active configuration data.

In still another additional embodiment of the invention, the display device, the processor, the dive device data interface, the configuration interface, and the memory are located within the dive mask frame.

In yet still another embodiment of the invention, the at least one lens includes a first connector connected to the display, the frame includes a second connector connected to the dive mask frame, and the first connector and the second connector are coupled such that the dive mask controller communicates with the display device.

In yet another additional embodiment of the invention, the display device includes a set of light emitting diodes and each light emitting diode in the set of light emitting diodes has a different color.

In still another additional embodiment of the invention, the processor further stores a dive device data log using the memory and the dive device data log includes at least one piece of dive device data captured using the sensor devices.

In yet still another additional embodiment of the invention, the sensor devices are selected from the group consisting of temperature sensors, depth sensors, pressure sensors, and time sensors.

In yet another embodiment of the invention, the display device includes at least one organic light emitting diode.

DETAILED DISCLOSURE OF THE INVENTION

Figure 1:
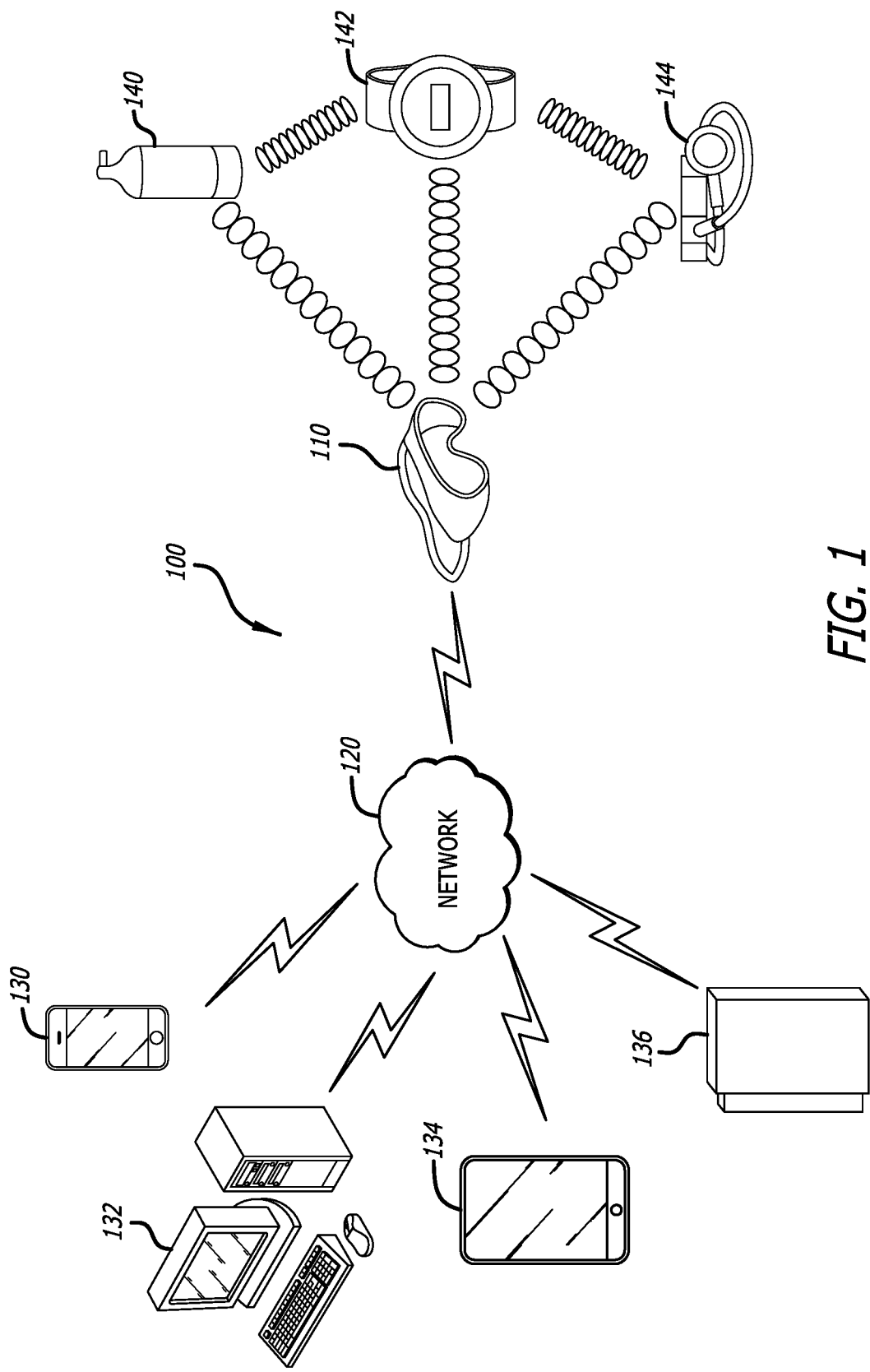
FIG. 1 is a conceptual illustration of a configurable dive mask in communication with a variety of devices in accordance with an embodiment of the invention.

Turning now to the drawings, configurable dive masks in accordance with embodiments of the invention are illustrated. Divers often wear dive masks in order to protect their face and enhance vision while underwater. Dive masks are commonly made of a relatively clear lens (such as a tempered glass plate or a composite lens) and a skirt of rubber or silicone that forms a watertight seal with the diver's face. In addition to the dive masks, divers often have a variety of additional equipment such as, but not limited to, one or more air tanks, rebreathers, dive computers, and sensors. Divers often need to keep track of data about the dive and/or their equipment while submerged. This can be data regarding pressure, depth, dive time remaining, time to decompression, oxygen time remaining, nitrogen tissue load, or any other piece of data that is relevant to the diver. Information may need to be interpreted in different ways depending on the type of dive, such as, but not limited to, free diving, shallow diving, or deep diving. Such information can be used to help ensure the safety of the diver. Dive devices, such as, but not limited to, the equipment carried by divers as described above, can generate dive device data including (but not limited to) data that describes this information. The dive device data can then be shown on a display that is integrated into or attached to the configurable dive mask. In many embodiments, the dive device data is transmitted to a dive mask worn by a second diver to alert the second diver. In this way, a second diver can be alerted to the dive conditions being experienced by the first diver. For example, a dive instructor can be notified when a dangerous condition is occurring with a student's equipment.

In many embodiments, configuration data can be used to map dive device data to a display device. Configuration data can be obtained from the configuration device via a network. The configurable dive mask can also obtain configuration data directly from configuration devices. Communication between the configurable dive mask and the configuration devices can be facilitated by a configuration interface. In a variety of embodiments, the configuration interface can operate using radio frequency (RF) communication technology, or any other type of communication technique that is operable above water. On the surface, RF technology can be used to communicate quickly over long distances; however, RF signals typically do not propagate effectively underwater. While submerged, dive device data can be obtained from one or more dive devices via a dive device data interface. The dive device data interface can operate using magnetic field communication technology, which has a range far enough to span more than the length of the diver's body, or any other communication technology that functions while submerged. In this way, the configurable dive mask can be adapted to display data in a variety of ways depending on the needs of the diver for a particular dive. This can aid the diver in being able to quickly view and process relevant information to dive in a safe and efficient manner. Additionally, the configuration data and/or obtained dive device data can be transmitted utilizing the configuration interface and/or dive device data interface as appropriate to the requirements of specific applications of embodiments of the invention.

Configurable Dive Mask Systems

A configurable dive mask system is illustrated in FIG. 1. The configurable dive mask system 100 includes a configurable dive mask 110. In several embodiments, the configurable dive mask 110 is configured to communicate with one or more configuration devices, including, but not limited to, cellular telephones 130, personal computers 132, presentation devices 134, and servers 136. In numerous embodiments, the configurable dive mask 110 is configured to communicate directly with one or more configuration devices via wireless and/or wired connections to the devices. In a variety of embodiments, the configurable dive mask 110 can be configured to communicate with the configuration devices via a network 120. In several embodiments of the invention, the network 120 is a local area network, a wide area network, the Internet, or an ad hoc network; however, any network 120 can be utilized as appropriate to the requirements of specific applications in accordance with embodiments of the invention. In a variety of embodiments, the configuration device can be a server that can push configuration data to one or more configurable dive masks via a network. In many embodiments, configuration devices are configured to obtain configuration data for the configurable dive mask. Configuration data can be used to control the display of dive device data using a display integrated into the configurable dive mask. Configuration data can be utilized to inform the processing and display of dive device data.

The configurable dive mask 110 can also be configured to communicate with dive devices. Dive devices can include, but are not limited to, sensor devices such as temperature, depth, gas pressure, and time sensors, or any other sensor device that generates dive device data as appropriate to the requirements of specific applications of embodiments of the invention. While many dive devices collect dive device data regarding the ambient conditions of the dive, many dive devices (including sensor devices) can be configured to measure data regarding a variety of devices such as, but not limited to, gas cylinders 140 and regulators 144. In some embodiments, sensor devices can be embedded in the configurable dive mask. In a variety of embodiments, sensor devices that are embedded in the configurable dive mask can have a hardwired connection to the dive mask controller. Dive devices also include any device capable of obtaining and/or processing data during a dive and/or related to the dive. These devices include, but are not limited to, rebreather computers and dive computers 142. However, it should be noted that dive devices can be any device that can detect, transmit, and/or receive data underwater as appropriate to the requirements of specific applications in accordance with embodiments of the invention.

In multiple embodiments, dive devices communicate with the configurable dive mask 110 via a dive device data interface. In numerous embodiments, the dive device data interface utilizes a communication technique or techniques different from the communication technique or techniques utilized by the configuration interface. In a variety of embodiments, the dive devices can relay information to other dive devices such as dive computers 142, rebreathers (and/or computers attached to the rebreather), or any other dive device data storage and/or processing device prior to, during, or after transmission to the configurable dive mask 110. In many embodiments, a dive device is any device capable of communicating with a configurable dive mask and/or a dive computer underwater. Additionally, in a variety of embodiments, the configurable dive mask 110 is configured to transmit configuration data and/or dive device data to other configurable dive masks and/or configuration devices.

Although a specific configurable dive mask system in accordance with an embodiment of the invention is conceptually illustrated in FIG. 1, any of a variety of configurable dive masks can also be utilized as appropriate to the requirements of specific applications of the invention. Systems and methods for configurable dive masks in accordance with embodiments of the invention are discussed in detail below.

Configurable Dive Masks

Configurable dive masks in accordance with embodiments of the invention can be configured to obtain configuration data and dive device data and process the dive device data in a specific manner determined by the configuration data. The processed dive device data can be displayed using the configurable dive mask. A configurable dive mask in accordance with an embodiment of the invention is conceptually illustrated in FIG. 2. The configurable dive mask 200 includes a processor 210 in communication with memory 240. The memory 240 can be any form of storage configured to store a variety of data, including, but not limited to, a display processing application 242, configuration data 244, and dive device data 246. The configurable dive mask 200 also includes a configuration interface 220 configured to receive and/or transmit data over a network connection. The configurable dive mask 200 also includes a dive device data interface 230 configured to receive data from and/or transmit data to dive devices and/or other configurable dive masks. In many embodiments, the dive device data interface 240 and/or the configuration interface 220 is in communication with processor 210 and memory 240. In numerous embodiments, a dive mask controller can include a processor 210. In other embodiments, the dive mask controller can include the processor 210 and any combination of configuration data interfaces, dive device data interfaces, memory, or any other component as appropriate to embodiments of the invention. The configurable dive mask 200 also includes a display device 250. Display devices can include, but are not limited to, light emitting diode indicators, organic light emitting diodes, video displays, segmented displays, or any other display device (or combination of display devices) that can be utilized to display data in accordance with embodiments of the invention. In many embodiments, the display devices are adapted for use in a particular environment, such as for underwater applications or for use in high-heat applications. In numerous embodiments, the display device 250 can be located within the lens of the configurable dive mask. In many embodiments, the lens of the configurable dive mask can have a connector that is connected to the display device 250. In a number of embodiments, the frame of the configurable dive mask can have a connector that is connected to the dive mask controller 200. In a plurality of embodiments, the lens connector and the frame connector can be coupled such that the dive mask controller 200 communicates with the display device 250. In a variety of embodiments, the dive mask controller can be embedded within the frame of the configurable dive mask.

In many embodiments, the configuration interface 220 uses electromagnetic waves (such as radio frequency waves) to communicate with external devices, which can be, but is not limited to, radio frequency communication technology such as Bluetooth, IEEE 802.11, or any other wireless communication technique.

In a number of embodiments, the dive mask controller 200 can obtain configuration data 244 over the configuration interface 220 and/or store the configuration data 244 in memory 240. In a variety of embodiments, the dive mask controller 200 can obtain dive device data 246 via a dive device data interface 230 and store the dive device data 246 in memory 240. Dive device data can be, but is not limited to, sensor data such as pressure, depth, and gas tank pressure readings. Additionally, dive device data can be, but is not limited to, data generated using a dive computer, rebreather computer, and/or any other device capable of processing data based on one or more pieces of raw data generated during a dive. This data includes, but is not limited to, location data, depth, dive time remaining, time to decompression, oxygen time remaining, nitrogen tissue load, time, or any other piece of data that is relevant to the diver. In numerous embodiments, a processor 210 can use a display processing application 242 to process dive device data 246 into display data. In many embodiments, display data is generated based on dive device data 246 along with configuration data 244. The display data can be utilized to display the dive device data using display device 250. The display device 250 can be made (in part or in whole) of and/or be coated with materials that prevent condensation and/or protect the display from water.

In many embodiments, configuration data 244 is preloaded onto the device. In several embodiments, the configuration data 244 can be rewritten based on updated configuration data received using the configuration interface 220. Configuration data 244 can be used to determine what portions of dive device data 246 are displayed, how dive device data 246 should be interpreted, how dive device data 246 should be displayed on display device 250, and/or any other manipulation (e.g. visualization) of dive device data 246 as appropriate to the requirements of specific applications in accordance with embodiments of the invention. In a number of embodiments, the configurable dive mask stores multiple pieces of configuration data and can dynamically (manually and/or automatically) switch between the different pieces of configuration data. In several embodiments, the configurable dive mask includes one or more input devices, such as but not limited to button(s), wired and/or wireless remotes, and/or a connection to a dive computer, that can generate input data that directs the processor 210 to load a particular piece of configuration data.

In a variety of embodiments, the configuration interface 220 and dive device data interface 230 uses the same communication technology. In numerous embodiments, the configuration interface 220 and dive device data interface 230 utilize different communication techniques. In numerous embodiments, the dive device data interface 230 uses magnetic fields to receive and/or transmit data. In a variety of embodiments, magnetic field communication is performed using a near-field magnetic induction communication system, where a transmitter coil modulates a magnetic field that is measured by a receiver coil. However, any magnetic communication system or any other communication system that operates underwater, such as a sonar-based communication system, can be utilized as appropriate to the requirements of specific applications in accordance with embodiments of the invention. In many embodiments, the configuration interface 220 and/or the dive device data interface 230 utilize a plurality of transmitters to communicate using a variety of communication technologies.

In some situations, multiple divers will be diving in close proximity to each other. It can be beneficial to the diver to only see dive device data from specific devices; for example, dive device data from their own dive devices and/or one or dive devices of a diving partner. In numerous embodiments, the dive device data interface 230 can recognize dive devices and receive and/or display dive device data only from those dive devices. In some embodiments, the display processing application 242 can determine what dive device data came from which dive device by using identifying information in the dive device data. Identifying information can be, but is not limited to, header data, transmission mode, or any other technique of determining the originating dive device. In this way, the configurable dive mask can display only the dive device data specified.

Figure 2:
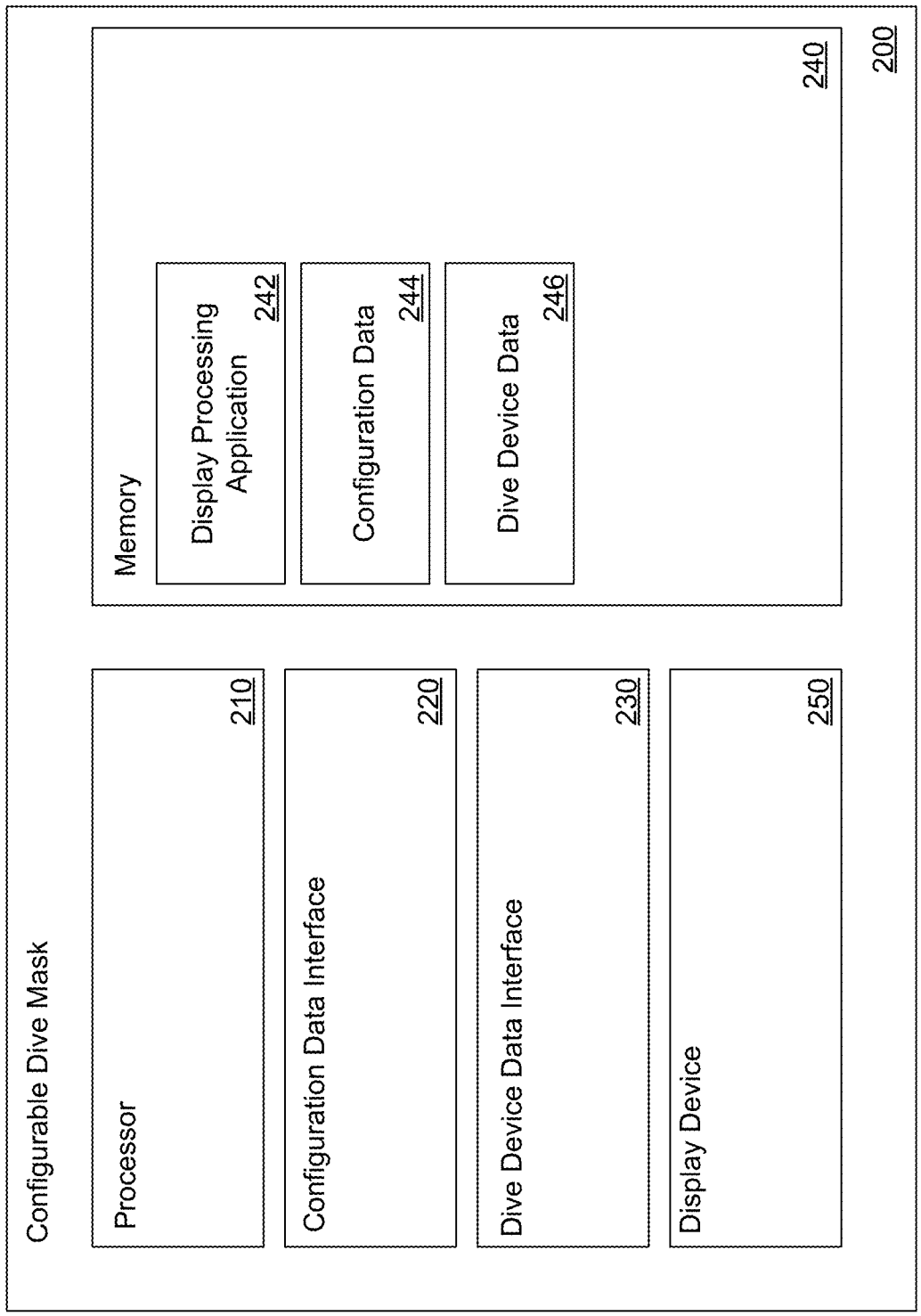
FIG. 2 is a conceptual illustration of a dive mask controller in accordance with an embodiment of the invention.

Although a specific architecture for a configurable dive mask in accordance with an embodiment of the invention is conceptually illustrated in FIG. 2, any of a variety of architectures, including those that utilize volatile and/or non-volatile memory and those that store additional data or host additional interfaces, can also be utilized. Processes for obtaining and displaying configuration data and display data in accordance with embodiments of the invention are discussed further below.

Utilizing Configurable Dive Masks

Configurable dive masks can be designed to display dive device data in a variety of ways. In many embodiments, the configurable dive masks include configuration data that defines how the dive device data is displayed using a display integrated into or attached to the configurable dive mask.

The configuration data can be obtained from any of a variety of configuration devices while the configurable dive mask is above water. In this way, the configurable dive mask can be reconfigured to display a variety of data during a dive that is relevant to the diver.

Dive device data can be processed in accordance with configuration data in order to display the dive device data in the way the user wants. Configuration data can be obtained from a variety of configuration devices via a configuration interface. Configuration devices can define the configuration data according to a variety of parameters including, but not limited to, breathing gas mix composition, diver gender, diver weight, what dive device data to display, how to display the dive device data, and/or any other configuration parameter as appropriate to specific applications of embodiments of the invention. Configuration data can be used to map particular values, ranges of values, and/or properties of dive device data to the display device. In this way, the display of the dive device data is tailored to the capabilities of the display device and the dive device data itself.

A diver may wish to configure the configurable dive mask to display a particular type of dive device data during a dive. The diver can configure the configurable dive mask to display that dive device data and then, while diving, the dive mask obtains dive device data and displays the dive device data according to the configuration. Furthermore, a diver can alter the display of information to change over the course of a dive in accordance with embodiments of the invention. The dive can configure the configurable dive mask to alter the display of data based on dive device data such as, but not limited to, time, depth, submersion, or any other piece or combination of dive device data as appropriate to the requirements of embodiments of the invention. In this way, the diver is presented with the dive device data in a custom way to fit the diver's choosing.

For example, a diver may wish to keep track of time during a dive. The configuration data can be made such that the processor selects the time from a host of obtained dive device data and displays the time on the configurable dive mask display. Similarly, configuration data can be made to select and display the breathing gas pressure, water pressure, or any other piece of dive device data that is appropriate to the requirements of specific applications. In many embodiments, the configuration data can contain more complex instructions, such as displaying multiple pieces of dive device data and any other information generated as a function of one or more pieces of dive device data. For example, depth as a function of water pressure, nitrogen tissue load as a function of multiple pieces of dive device data such as, but not limited to, time, depth, breathing rate, or any other piece of dive device data needed to compute complex functions. In a variety of embodiments, the configuration data includes a serial number, diver identification data, depth data, distance data, heading data, pressure data, and/or text data related to the dive. Additionally, the configuration data and/or obtained dive device data can be transmitted utilizing a variety of processes, including those described below.

In order to display current information, the configurable dive mask can obtain updates from dive devices. During the dive, the configurable dive mask can obtain dive device data though the dive device interface continuously or on a schedule. The configurable dive mask can process the dive device using configuration data and a processor. Based on the configuration data, the processor can chose what dive device data to display, and how to display dive device data. In a variety of embodiments, preprocessing of dive device data can occur, in part or in whole, on a processor external to the configurable dive mask. Dive devices such as, but not limited to, dive computer and rebreather computers can process dive device data in a similar fashion as the configurable dive mask. Preprocessing of one or more pieces of dive device data can be performed using an external processor. If dive device data is preprocessed on a processor separate from the configurable dive mask, the configurable dive mask can obtain the preprocessed dive device data from the underwater processor via the dive device data interface. The preprocessed dive device data can then be processed on the configurable dive mask utilizing techniques similar to those described above.

Figure 3:
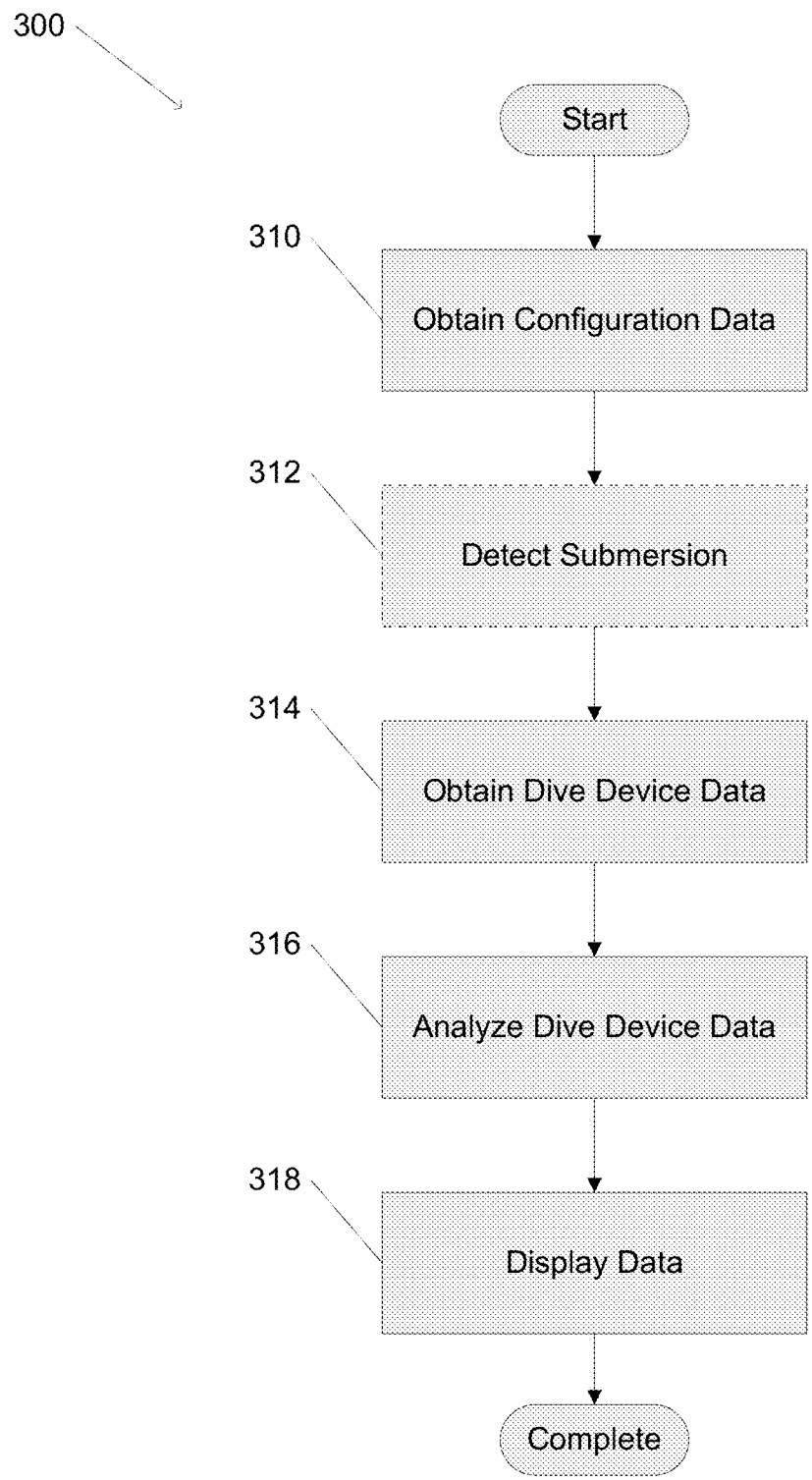
FIG. 3 is a flow chart illustrating a process for diving with a configurable dive mask in accordance with an embodiment of the invention.

A process for utilizing configurable dive masks in accordance with an embodiment of the invention is conceptually illustrated in FIG. 3. The process 300 includes obtaining configuration data (310), and, in a variety of embodiments, submersion is detected (312). Dive device data is obtained (314), analyzed (316), and displayed (316).

Although a specific process for using a configurable dive mask in accordance with an embodiment of the invention is described above with respect to FIG. 3, any of a variety of processes can be performed as appropriate to the requirements of specific applications of embodiments of the invention. Techniques for configuring dive masks are discussed further below.

Configuring Dive Masks

Configuration data can be utilized to configure the configurable dive mask. Configuration data allows divers to customize their diving experience by determining what, when, and/or how dive device data is displayed. Configuration devices can be used to generate configuration data. In many embodiments, the configuration device can obtain the configuration data that is stored on the configurable dive mask and can display the configuration data. If the configuration data stored in the configurable dive mask is different from the configuration data generated by the configuration device, the configuration device can transmit new configuration data to the configurable dive mask, or update the configuration data stored in the configurable dive mask. In this way, it can be determined if the current configuration should be updated.

In a variety of embodiments, configuration devices can determine what type of display device is used by the configurable dive mask. Configuration devices can also generate configuration data specific to a display device. In many embodiments, the configuration device can determine the processing capabilities and/or storage configuration of the configurable dive mask. Configuration devices can generate configuration data specific to the hardware of a configurable dive mask. Determining the hardware specifications of configurable dive mask hardware can be done by receiving identifying data from the configurable dive mask. Identifying data can include the configurable dive mask serial number, model number, or any other piece of identifying information as appropriate to the requirements of specific applications. In some embodiments, identifying data can contain the capabilities of the configurable dive mask with respect to processing, communication, display, and/or any other piece of information regarding the specifications of the configurable dive mask as appropriate to the requirements of various applications. In a number of embodiments, identifying data can allow the lookup of the specifications of the configurable dive mask by the configuration device. In many embodiments, the configuration device can store previous configurations, and/or have preset configurations.

Divers often perform multiple dives in quick succession. Divers may wish to display a variety of data and/or different displays of the data during different dives. In many embodiments, configuration devices use RF transmission methods to send and receive data from the configurable dive mask. In this way, the configurable dive mask can be quickly configured prior to a dive. However, any of a variety of methods for transmission between configuration devices and the configurable dive mask, including those described above, can be utilized in accordance with embodiments of the invention. In some embodiments, the configuration device can modify existing configuration data to meet the updated requirements of the configuration data received by the configuration device. In other embodiments, the configuration data on the configurable dive mask is overwritten by updated configuration data from the configuration device.

In some embodiments, the configurable dive mask can store multiple pieces of configuration data. Active configuration data is the configuration data that the display processing application has configured the processor to use. The active configuration data can be changed any time, including prior to, during, or after a dive. The active configuration data can be changed by receiving input data from a configuration device, a dive device, via an input device (such as a configuration selection switch or button) on the configurable dive mask itself, and/or any other device as appropriate to the requirements of specific applications in accordance with embodiments of the invention. In various embodiments, one or more sets of configuration data can be selectively deleted from the configurable dive mask memory. In many embodiments, a piece of configuration data includes a set of configuration parameters describing the specific processing of dive device data and/or the mapping of dive device data to the display device. In many embodiments, modifying a piece of configuration data and/or switching the active configuration data includes adding, modifying, and/or deleting one or more of configuration parameters within one or more pieces of configuration data.

Ensuring the integrity of the configuration data can prevent malfunction of the configurable dive mask. In numerous embodiments, the configurable dive mask and/or the configuration device can validate the configuration data. Validation can include checking the configuration data based on safety, checking the integrity of the transmission of the configuration data, checking that the display device can adequately display the dive device data, or any other validation check that can be made in accordance with applications of embodiments of the invention. In some embodiments, the configuration device can check a configuration data against a range of known safe configuration data in order to determine the safety of a configuration data. In this way, malfunctions in operation of the configurable dive mask can be avoided.

Figure 4:
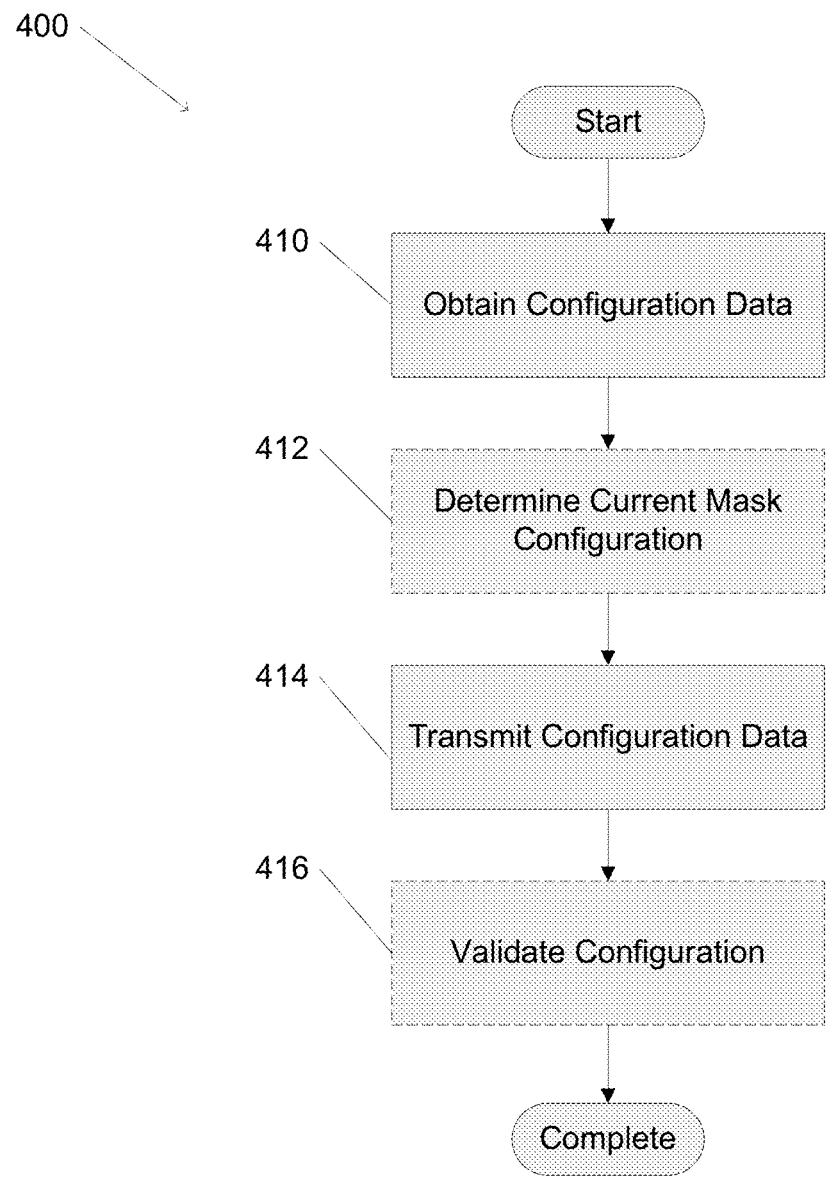
FIG. 4 is a flow chart illustrating a process for configuring a configurable dive mask in accordance with an embodiment of the invention.

A process for configuring a dive mask in accordance with an embodiment of the invention is illustrated in FIG. 4. The process 400 includes obtaining (410) configuration data. In many embodiments of the invention, the current dive mask configuration is determined (412). The configuration device transmits the configuration data (414) to the mask controller. In numerous embodiments of the invention, the configuration data is validated (416).

Although specific processes are described above with respect to configuring configurable dive masks, any of a variety of techniques can be utilized to configure configurable dive masks as appropriate to the requirements of specific applications in accordance with embodiments of the invention. Processes for analyzing dive device data are discussed further below.

Displaying Dive Device Data

During a dive, dive device data can be obtained from a variety of dive devices via the dive device data interface. Dive device data can be processed in order to generate display data. Displaying dive device data can include a variety of different transformations. In some embodiments, processing steps can be determined by the configuration data. In other embodiments, some, but not all processing steps can be determined by the configuration data. The configuration data can include instructions for combining multiple pieces of device data into the display data to be displayed using the display device. Processing of dive device data from one or more pieces of dive device data can occur on external processors.

Configurable dive masks can map display data to the display device. Display data can be processed from dive device data in accordance with configuration data using a display processing application. The display processing application can determine the mapping of dive device data to the display device based on the configuration data provided for display using the configurable dive mask. Configuration data can describe the output capabilities of the display device and how dive device data values, ranges of values, or any other property of dive device data, can be mapped to the display device. For example, a configurable dive mask may have a display device consisting of a red, a yellow, and a green light emitting diode (LED). Configuration data can be generated such that if there is over an hour of air time remaining, then the green LED can be turned on. If there is less than an hour of air time, but more than 15 minutes of air time, the yellow LED can be turned on. If there is less than 15 minutes of air time, the red LED can be turned on. If the display device is a segmented display, the display can show the time in minutes remaining and/or a textual interpretation of the dive device data such as, but not limited to, "OK," "WARNING," or "DANGER." While the above is one example of a configurable dive mask configuration, any of a variety of configuration data and display devices can be used in accordance with embodiments of the invention.

Divers may want to keep logs of dives they have taken. In some embodiments, any combination of display data, dive device data, and configuration data can be logged in configurable dive mask memory, or in an external memory device. In many embodiments, configuration data can be matched with dive display data and/or dive device data in the log file. In this way, the diver can keep store information regarding previous dives and, in some embodiments, the configuration data used for specific dives.

Figure 5:
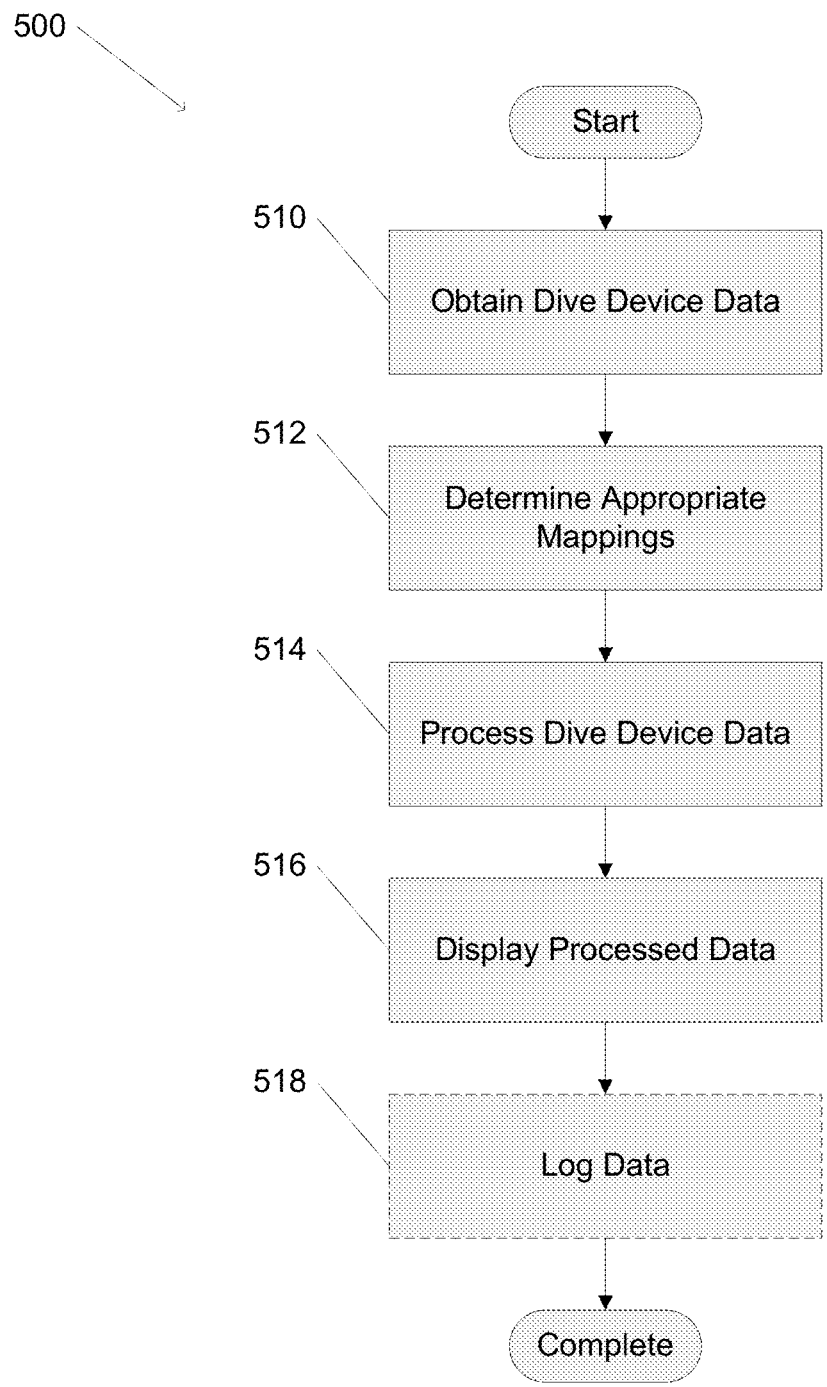
FIG. 5 is a flow chart illustrating a process for displaying dive device data in accordance with an embodiment of the invention.

A process for displaying dive device data in accordance with an embodiment of the invention is illustrated in FIG. 5. The process 500 includes obtaining (510) dive device data from dive devices and determining (512) what processing steps to take. Dive device data is processed (514) and displayed (516). In a variety of embodiments of the invention, data is logged (518).

Although specific processes are described above with respect to displaying dive device data, any of a variety of techniques can be utilized to generate display data from dive device data as appropriate to the requirements of specific applications in accordance with embodiments of the invention.

Transmitting Dive Device Data

In a variety of embodiments, configurable dive masks include a variety of memory (or other data storage) that can be utilized to store dive device data obtained from a variety of dive devices in addition to configuration data. In many embodiments, the configuration data can be updated based on the obtained dive device data utilizing processes similar to those described above. Additionally, display data generated based on the dive device data can also be stored. In several embodiments, configurable dive masks can transmit this stored data using the configuration interface to one or more devices when the configurable dive mask is above water. In this way, the dive device data, display data, and/or configuration data can be transmitted for viewing, testing, processing, and/or storage using external devices. For example, the display data can be analyzed to determine potential bugs in the configuration data and facilitate improvements in the display of obtained dive device data. Additionally, the stored data can be utilized to reconstruct particular portions of the dive. Similarly, the data can be transmitted using the dive device data interface as appropriate to the requirements of specific applications of embodiments of the invention.

Figure 6:
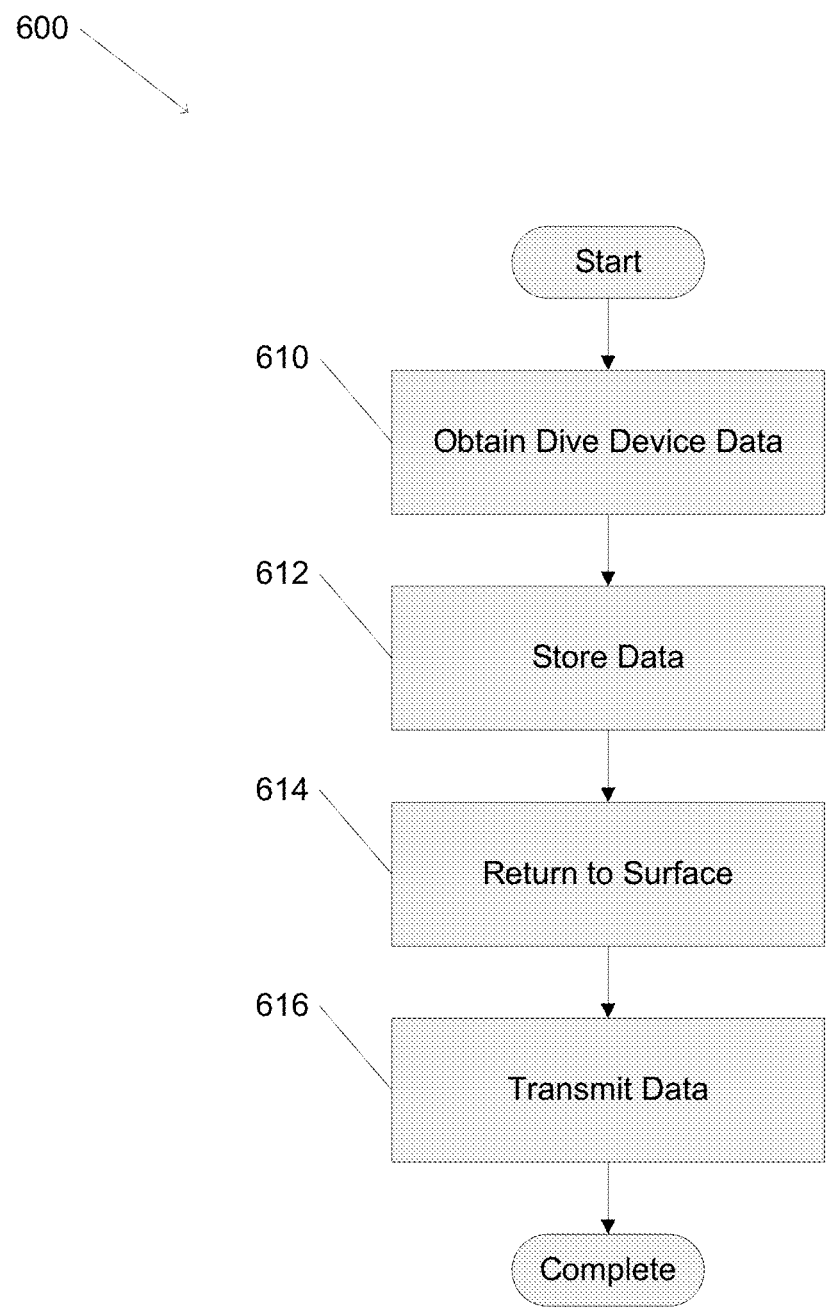
FIG. 6 is a flow chart illustrating a process for transmitting dive device data in accordance with an embodiment of the invention.

Turning now to FIG. 6, a process for transmitting dive device data in accordance with an embodiment of the invention is shown. The process 600 includes obtaining (610) dive device data, storing (612) dive device data, returning (614) to the surface, and transmitting (614) dive device data. Specific processes are described above with respect to transmitting dive device data; however, any of a variety of techniques can be utilized to transmit dive device data as appropriate to the requirements of specific applications in accordance with embodiments of the invention.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A configurable dive mask, comprising:
a display device;
a processor;
memory;
a data interface that communicates with a set of dive devices to obtain dive device data, the data interface comprising a sonar communication system wherein the dive device data is capable of being received by the configurable dive mask and other dive masks; and
a configuration interface that wirelessly communicates with configuration devices to obtain configuration data above water, the configuration interface comprising a second communication system;
wherein the processor is configured to:
receive configuration data via the configuration interface;
receive dive device data via the data interface;
determine a portion of the dive device data to display based upon the configuration data; and
display dive device data in accordance with the configuration data, wherein the configuration data is validated using a device selected from the group consisting of the configuration device and the configurable dive mask.

2. The configurable dive mask of claim 1, wherein the second communication system is a radio frequency communication system.

3. The configurable dive mask of claim 1, wherein:
the configurable dive mask further comprises multiple dive device data interfaces; and
each dive device data interface communicates with a distinct subset of dive devices.

4. The configurable dive mask of claim 3, wherein:
the configurable dive mask further comprises a set of integrated sensor components;
a subset of the sensor components in the set of sensor components collect dive device data; and
the configurable dive mask obtains dive device data from the sensor components in the set of sensor components via the dive device data interface.

5. The configurable dive mask of claim 4, wherein:
the configurable dive mask obtains dive device data from sensor components in the set of sensor components via a hardwired connection.

6. The configurable dive mask of claim 1, wherein the configurable dive mask communicates with a subset of the set of dive devices.

7. The configurable dive mask of claim 1, wherein:
a first dive device in the set of dive devices obtains dive device data from a second separate and distinct dive device in the set of dive devices; and
the first dive device processes the obtained dive device data to generate processed dive device data; and
the first dive device transmits the processed dive device data to the configurable dive mask via the dive device interface.

8. The configurable dive mask of claim 1, wherein the processor is further configured to utilize select active configuration data, where the active configuration data is selected from the set of configuration data.

9. The configurable dive mask of claim 8, wherein:
the configurable dive mask further comprises an input device that obtains input data; and
the processor is further configured to select a second piece of active configuration data from the set of configuration data in response to the input data, where the second piece of configuration data is separate and distinct from the active configuration data.

10. The configurable dive mask of claim 1, wherein the configurable dive mask further comprises a dive mask frame and at least one lens, and wherein the display device is embedded within the lens.

11. The configurable dive mask of claim 10, wherein the processor is located within the dive mask frame.

12. The configurable dive mask of claim 1, wherein the processor is further configured to store a dive device data log using the memory.

13. The configurable dive mask of claim 1, wherein the display device comprises a set of light emitting diodes.

14. The configurable dive mask of claim 13, wherein the set of light emitting diodes includes light emitting diodes of at least two different colors.

15. The configurable dive mask of claim 1, wherein the configurable dive mask further comprises one or more sensor devices, the one or more sensor devices selected from a group consisting of temperature sensors, depth sensors, pressure sensors, and time sensors.

16. The configurable dive mask of claim 1, wherein the display device comprises at least one organic light emitting diode.

17. The configurable dive mask of claim 1, wherein the set of dive devices are selected from a group consisting of dive computers, rebreathers, and other dive masks.

18. The configurable dive mask of claim 1, wherein the underwater communication system comprises a sonar communication system.

19. The configurable dive mask of claim 1, wherein the underwater communication system comprises a magnetic communication system.

20. A configurable dive mask, comprising:
a dive mask frame;
a display device coupled to the dive mask frame;
a processor;
memory;
a sonar communication system capable of receiving dive device data;
a configuration interface comprising a second communication system, wherein the configuration interface is capable of communicating with configuration devices to obtain and validate configuration data when the configuration interface is above water, and wherein validating the configuration data comprises determining when the configuration data is safe to use by checking the configuration data against a known range of safe configuration data; and
wherein the processor is configured to:
receive the validated configuration data via the configuration interface;
receive dive device data;
determine a portion of the dive device data to display based upon the validated configuration data; and
display dive device data in accordance with the validated configuration data.

21. The configurable dive mask of claim 20, wherein the second communication system is a radio frequency communication system.

22. The configurable dive mask of claim 20, wherein the configuration interface is implemented using the processor.

23. The configurable dive mask of claim 20, wherein the dive device data is displayed using the display.

24. The configurable dive mask of claim 20, wherein the processor is located within the dive mask frame.

25. The configurable dive mask of claim 20, wherein the processor is further configured to store a dive device data log using the memory.

26. The configurable dive mask of claim 20, wherein the configurable dive mask further comprises a dive mask frame and at least one lens, and wherein the display device is embedded within the lens.

27. The configurable dive mask of claim 20, wherein the display device comprises a set of light emitting diodes.

28. The configurable dive mask of claim 27, wherein the set of light emitting diodes includes light emitting diodes of at least two different colors.

29. The configurable dive mask of claim 20, wherein the configurable dive mask further comprises one or more sensor devices, the one or more sensor devices selected from a group consisting of temperature sensors, depth sensors, pressure sensors, and time sensors.

30. The configurable dive mask of claim 20, wherein the display device comprises at least one organic light emitting diode.

31. The configurable dive mask of claim 20, wherein the sonar communication system is further capable of communicating with one or more dive devices, the one or more dive devices selected from a group consisting of dive computers, rebreathers, and other dive masks.

32. The configurable dive mask of claim 20, wherein the underwater communication system comprises a sonar communication system.

33. The configurable dive mask of claim 20, wherein the underwater communication system comprises a magnetic communication system.

* * * * *